Patented Apr. 29, 1930

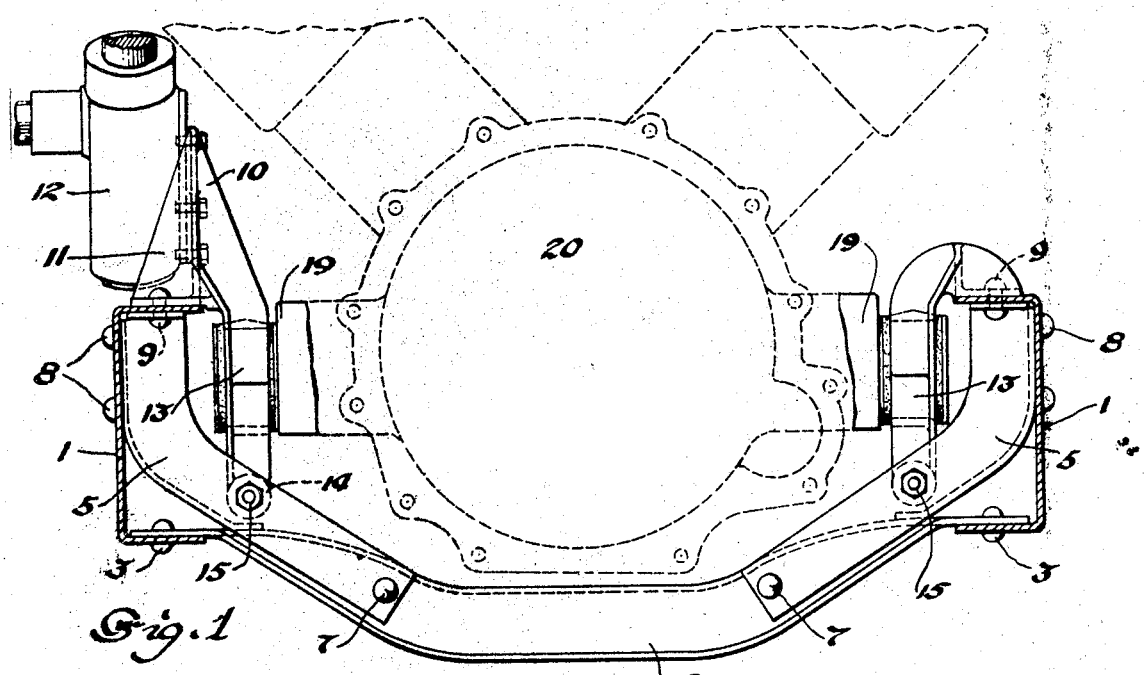
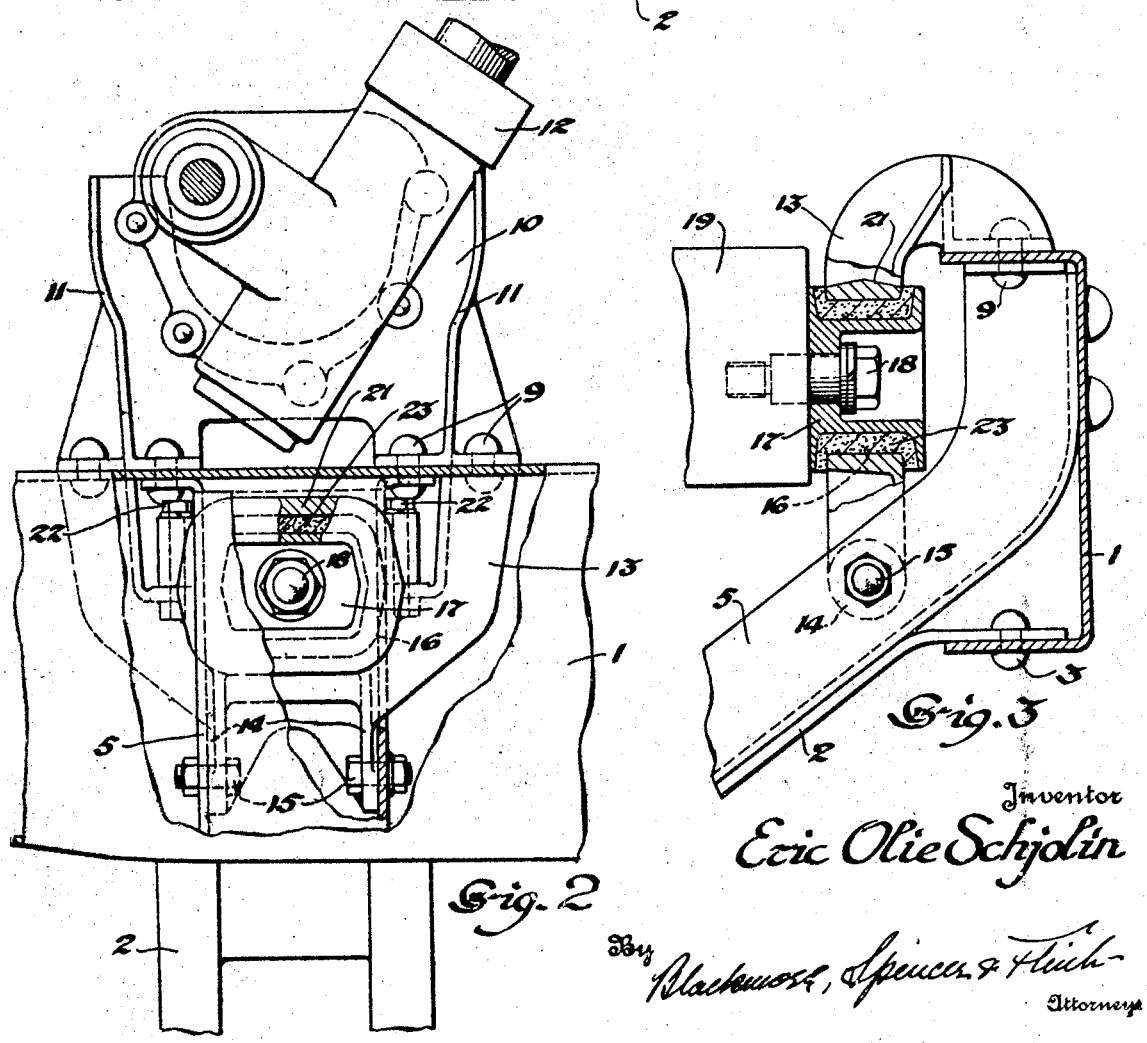

1,756,913

UNITED STATES PATENT OFFICE

ERIC OLIE SCHJOLIN, OF BIRMINGHAM, MICHIGAN, ASSIGNOR TO YELLOW TRUCK & COACH MANUFACTURING COMPANY, OF PONTIAC, MICHIGAN, A CORPORATION OF MAINE

FRAME CONSTRUCTION

Application filed January 9, 1928. Serial No. 245,398.

My invention relates to motor vehicles, and more particularly to an improvement in the chassis frame construction.

The invention contemplates the use of a pair of specially designed cast metal brackets for use between the transverse frame member and the longitudinal frame members whereby the brackets and transverse frame member serve to reinforce each other to afford a rigid frame construction, and by means of which brackets, an engine may be supported, preferably in vibration absorbing cushions; one of the brackets also being formed to provide a rigid mounting for the steering column.

A preferred embodiment of the invention is illustrated in the accompanying drawing wherein—

Fig. 1 is a transverse sectional view of a chassis frame showing the parts in assembled relation;

Fig. 2 is a fragmentary side elevation looking to the right in Fig. 1, with parts broken away; and Fig. 3 is an enlarged detail partly in section of the right-hand portion of the construction shown in Fig. 1.

Referring to the drawing, the numerals 1—1 indicates a pair of channel shaped longitudinally extending side members or sills of a chassis frame which, following general practice, are to be connected at spaced intervals by transverse cross members. The cross member shown in Fig. 1 comprises a channel bar 2, centrally depressed or dropped and having flattened ends connected by rivets or bolts 3 to the bottom flange of the side members 1, and a pair of channel portions 5—5 having their side walls at one end secured as at 7, by bolting, riveting, welding or the like to the side walls of the channel bar 2. These portions 5—5 extend upwardly within the channels of the side sills and are secured to the vertical walls thereof by bolts or rivets 8, and to the top flange by rivets or bolts 9. The same rivets or bolts 9 also fasten the pair of cast metal brackets to the top flange of the side sills. These brackets, which form an important part of the present invention, differ from each other in that the one shown on the left in Fig. 1 has an upwardly extending portion 10, reinforced by suitable webs or flanges 11, upon which the lower end 12 of a steering column is mounted.

In other respects the construction of the brackets is substantially the same, each having a downwardly projecting portion or leg 13, provided at its lower end with a pair of ears 14 for attachment by bolts 15 to the sides of the part 5, of the transverse frame member.

Formed in each leg 13 is a pocket or socket 16 which receives a head 17, connected by a bolt 18 to the lateral arm 19, projecting from the side of internal combustion engine 20, carried between the side frame members and above the depressed central portion of the transverse member; the head 17 being held in place by a retainer cap 21 detachably secured by bolts 22 to the leg 13.

In order to avoid metallic contact and to insulate the engine and bracket from each other, a cushion body or pad 23 of rubber or similar elastic composition is positioned within a peripheral groove in the head 17. In this manner the engine vibrations are absorbed and the engine itself is free from shocks and stresses incident to vehicular travel.

From the above description it will be apparent that there is provided a construction which will be simple in design, economical to manufacture, and which may be readily assembled or disassembled in the event repairs become necessary.

It will be noted that the steering column may be removed without disturbing the engine, and vice versa the engine may be readily lifted out of the chassis frame upon the removal of the retainer caps, without affecting the steering column or the relation of other parts. Since the bracket and transverse member serve to brace each other, the assembly affords an exceptionally sturdy transverse frame construction.

While the parts have been described in terms that are more or less specific, it is to be understood that the invention is not limited to the exact details, and that such modifications may be made as come within the scope of the appended claims.

Having described my invention, I claim:

1. In a motor vehicle chassis frame, the combination of a pair of angularly disposed frame members and a steering column supporting bracket secured to both of said members.

2. In a motor vehicle chassis frame, the combination of a pair of angularly disposed frame members and a bracket secured to both of said members to reinforce the same and providing both a steering column support and an engine mounting.

3. A bracket member having a portion on which an engine may be supported and another portion on which a steering column may be mounted.

4. A bracket member adapted to be secured to both a longitudinal chassis frame member and a transverse chassis frame member, and having an upwardly extending portion adapted to support a steering column, and being provided with a socket for the reception of an engine supporting appendage, and a retainer cap detachably associated with said socket.

5. A bracket member adapted to be secured to both a longitudinal chassis frame member and a transverse chassis frame member, and having a socketed portion to receive an engine supporting appendage and a retainer cap detachably engageable with said socketed portion.

6. In a motor vehicle chassis frame, the combination of a pair of longitudinal members, a transverse member, a bracket secured both to the transverse member and to one of said longitudinal members and arranged to support an engine and a bracket secured both to said transverse member and to the other of said longitudinal member and arranged to support an engine and a steering column.

7. In a motor vehicle chassis frame, the combination of a pair of channelled side members, a cross bar comprising a member having a central dropped portion with its ends secured to the bottom flanges of said side members and other portions secured to said member adjacent its ends and secured to the top flanges of said side members, and a pair of brackets secured to said top flanges and having dependent legs secured to the last mentioned portions of said cross bar, and to which the opposite sides of an engine located between said side members and above said central dropped portion of the cross bar, are to be secured, one of said brackets having an upwardly extending part for mounting a steering column thereon.

8. In combination, a bracket adapted to be secured to both a longitudinal member and a transverse member of a chassis frame and having a socketed portion, a removable cap cooperatively associated with said socketed portion, a lateral projection on a body to be supported located between said socketed portion and cap and a resilient cushion interposed between said projection and said socketed portion and cap.

9. The combination set forth in claim 8, wherein the bracket has a portion formed thereon for the mounting of a steering column thereon.

10. In a motor vehicle, a bracket adapted to be secured adjacent opposite ends to a longitudinal chassis frame member, and a transverse chassis frame member respectively, and serving both as a reinforcement for the chassis frame and as a mounting for a part to be supported by the frame.

11. In a motor vehicle, a bracket adapted to be secured adjacent opposite ends to a longitudinal chassis frame member, and a transverse chassis frame member respectively, and to provide supports at intermediate points for both a steering column and an engine.

12. In a motor vehicle, a bracket having a lateral portion to be secured to a longitudinal chassis frame member, and a dependent portion to be secured to a transverse chassis frame member, and forming a mounting for a part to be supported.

In testimony whereof I affix my signature.

ERIC OLIE SCHJOLIN.